United States Patent [19]

Borth et al.

[11] Patent Number: 4,630,304

[45] Date of Patent: Dec. 16, 1986

[54] AUTOMATIC BACKGROUND NOISE ESTIMATOR FOR A NOISE SUPPRESSION SYSTEM

[75] Inventors: David E. Borth, Palatine; Ira A. Gerson, Hoffman Estates; Richard J. Vilmur, Palatine, all of Ill.

[73] Assignee: Motorola, Inc., Schaumburg, Ill.

[21] Appl. No.: 750,572

[22] Filed: Jul. 1, 1985

[51] Int. Cl.[4] .................... H04B 15/00

[52] U.S. Cl. .................... 381/94; 381/71; 381/47; 381/68

[58] Field of Search .................... 381/58, 68, 71, 94, 381/102, 107, 47; 179/107 R, 107 FD

[56] References Cited

U.S. PATENT DOCUMENTS

| | | | |
|---|---|---|---|
| 4,025,721 | 5/1977 | Graupe | 381/94 |
| 4,025,724 | 5/1977 | Davidson, Jr. | 381/71 |
| 4,063,031 | 12/1977 | Grunza | 381/47 |
| 4,133,976 | 1/1979 | Atal | 381/47 |
| 4,239,938 | 12/1980 | Ponto | 381/104 |
| 4,283,601 | 8/1981 | Nakajima | 381/47 |
| 4,396,806 | 8/1983 | Anderson | 179/107 FD |
| 4,403,118 | 9/1983 | Zollner | 179/107 FD |
| 4,433,435 | 2/1984 | David | 381/94 |
| 4,490,841 | 12/1984 | Chaplin | 381/94 |
| 4,508,940 | 4/1985 | Steeger | 179/107 FD |

FOREIGN PATENT DOCUMENTS

| | | | |
|---|---|---|---|
| 58-119214 | 7/1983 | Japan | 381/71 |

*Primary Examiner*—Gene Z. Rubinson
*Assistant Examiner*—L. C. Schroeder
*Attorney, Agent, or Firm*—Douglas A. Boehm; Donald B. Southard; Charles L. Warren

[57] ABSTRACT

An improved background noise estimator (320) is disclosed for use with a noise suppression system (300) for generating an estimate of the background noise power spectral density provided to noise suppressor (310), which performs speech quality enhancement upon the pre-processed speech-plus-noise signal available at the input to generate a clean post-processed speech signal at the output. Background noise estimator (320) utilizes an energy valley detector based upon post-processed speech to perform the speech/noise classification, and a noise spectral estimator based upon pre-processed speech to generate an estimate of the background noise power spectral density. As a result, the background noise estimate supplied to the noise suppressor is a more accurate measurement of the background noise energy, since it is performed during a more accurate determination of the occurrences of pauses in the speech.

33 Claims, 8 Drawing Figures

—PRIOR ART—

AUTOMATIC BACKGROUND NOISE ESTIMATOR FOR A NOISE SUPPRESSION SYSTEM

BACKGROUND OF THE INVENTION

1. Field of the Invention

The present invention relates generally to noise suppression systems, and, more particularly, to a novel technique for estimating the background noise power spectrum for a spectral subtraction noise suppression system.

2. Description of the Prior Art

Acoustic noise suppression has been implemented in a wide variety of speech communications, varying from basic hearing aid applications to highly sophisticated military aircraft communications systems. The common objective in all such noise suppression systems is that of enhancing the quality of speech in an environment having a relatively high level of ambient background noise. The acoustic noise suppression system must augment the quality characteristics of the speech signal by reducing the background noise level without significantly degrading the voice intelligibility.

A possible solution to this problem is to incorporate an acoustic noise suppression prefilter, which effectively subtracts an estimate of the background noise signal from the noisy speech waveform, to perform the noise cancellation function. One technique for obtaining the estimate of the background noise is to implement a second microphone, located at a distance away from the user's first microphone, such that it picks up only background noise. This technique has been shown to provide a significant improvement in signal-to-noise ratio (SNR). However, it is very difficult to achieve the required isolation of the second microphone from the speech source while at the same time attempting to pick up the same background noise environment as the first microphone.

Another method for obtaining the background noise estimate is to estimate statistics of the background noise during the time when only background noise is present, such as during the pauses in human speech. This method is based on the assumption that the background noise is predominantly stationary, which is a valid assumption for many types of noise environments. Therefore, some mechanism for discriminating between background noise and speech is required.

Several approaches to the problem of distinguishing between speech and noise are known in the art. A summary of some of these techniques is found in P. De Souza, "A Statistical Approach to the Design of an Adaptive Self-Normalizing Silence Detector," *IEEE Trans. Acoust., Speech, Signal Processing,* vol. ASSP-31, no. 3, (June 1983), pp. 678–684, and the references contained therein. These prior art techniques implement various combinations of: (a) frame-to-frame energy; (b) zero-crossing rate; and (c) autocorrelation function or LPC coefficients.

In abnormally high noise environments, such as a moving vehicle, many of these known and referenced prior art techniques break down. For example, it has been widely documented that many types of noise do not lend themselves to an all-pole model, thereby not permitting an LPC fit. Furthermore, discrimination between speech and noise in a high background noise environment on the basis of zero-crossings has also been shown to be ineffective due to the similar zero crossing characteristics of speech and noise.

The frame energy parameter has been found to be the most effective technique to discriminate between noise and speech. Consequently, the majority of speech recognition systems and communications systems which are designed for use in high ambient noise environments makes use of some variation of this technique.

Unfortunately, the speech/noise classification on the basis of frame energy measurements has been effective only for voiced sounds due to the similar energy characteristics of unvoiced sounds and background noise. It is widely known that the energy histogram technique for distinguishing between speech and noise performs sufficiently well in normal ambient noise environments. Since energy histograms of acoustic signals exhibit a bimodal distribution, in which the two modes correspond to noise and speech, then an appropriate threshold can be set between the two modes to provide the speech/noise classification. (See, e.g., W. J. Hess, "A Pitch-Synchronous Digital Feature Extraction System for Phonemic Recognition of Speech," *IEEE Trans. Acoust., Speech, Signal Processing,* vol. ASSP-24, no. 1 (February 1976), pp. 14–25.) The disadvantage of this approach is that the distinction between background noise energy and unvoiced speech energy in relatively high noise environments is unclear. Consequently, the task of accurately finding the two modes of the energy histogram and setting the appropriate threshold between them is extremely difficult.

SUMMARY OF THE INVENTION

It is, therefore, a primary object of the present invention to provide an improved method and apparatus for estimating the background noise power spectrum for use with an acoustic noise suppression system.

A more particular object of the present invention is to provide a method and apparatus to determine when the input signal contains only background noise as distinguished from an input signal containing speech plus background noise.

Still another object of the present invention is to provide a means for automatically updating the previous background noise estimate during those periods when only background noise is present.

In practicing the invention, an apparatus and method is provided for automatically performing background noise estimation for use with an acoustic noise suppression system, wherein the background noise from a noisy pre-processed input signal—the speech-plus-noise signal available at the input of the noise suppression system—is attenuated to produce a noise-suppressed post-processed output signal—speech-minus-noise signal provided at the output of the noise suppression system—by spectral gain modification. The automatic background noise estimator includes a noise estimation means which generates and stores an estimate of the background noise power spectral density based upon the pre-processed input signal. The background noise estimator of the present invention further includes a noise detection means, such as an energy valley detector, which performs the speech/noise decision based upon the post-processed signal energy level. The noise detection means provides this speech/noise decision to the noise estimation means such that the background noise estimate is updated only when the detected minima of the post-processed signal energy is below a predetermined threshold. The novel technique of implementing post-processed speech energy for the noise detection means, thereby controlling the pre-processed speech energy to the noise estimation means, allows the present invention to generate a highly accurate background noise estimate for an acoustic noise suppression system.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings, in which:

DESCRIPTION OF THE PREFERRED EMBODIMENT

Figure 1:
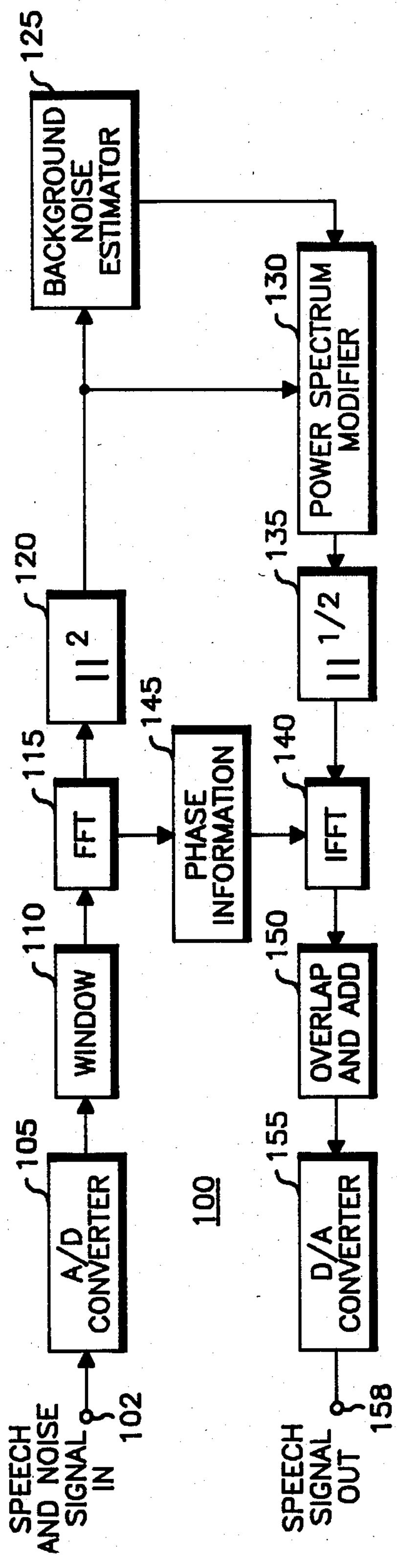
PRIOR ART Fig. 1
FIG. 1 is a block diagram of a basic noise suppression system known in the art which illustrates the spectral gain modification technique.

Referring now to the drawings, FIG. 1 is a block diagram of basic noise suppression system 100 implementing spectral gain modification as is well known in the art. A continuous time signal containing speech-plus-noise is applied to input 102 of the noise suppressor where it is then converted to digital form by analog-to-digital converter 105. This digital data is then segmented into blocks of data by the windowing operation (e.g., Hamming, Hanning, or Kaiser windowing techniques) performed by window 110. The choice of the window is similar to the choice of the filter response in an analog spectrum analysis. The noisy speech signal is converted into the frequency domain by Fast Fourier Transform (FFT) 115. The power spectrum of the noisy speech signal is then calculated by magnitude squaring operation 120, and applied to background noise estimator 125 and to power spectrum modifier 130.

The background noise estimator performs two basic functions: (1) it determines when the incoming speech-plus-noise signal contains only background noise; and (2) it updates the old background noise power spectral density estimate when only background noise is present. The current estimate of the background noise power spectrum is removed from the speech-plus-noise power spectrum by power spectrum modifier 130, which ideally leaves only the power spectrum of clean speech. The square root of the clean speech power spectrum is then calculated by magnitude square root operation 135. This magnitude of the clean speech signal is combined with phase information 145 of the original signal, and converted from the frequency domain back into the time domain by Inverse Fast Fourier Transform (IFFT) 140. The discrete data segments of the clean speech signal are then applied to overlap-and-add operation 150 to reconstruct the processed signal. This digital signal is then re-converted by digital-to-analog converter 155 to an analog waveform available at output 158. Thus, an acoustic noise suppressor employing the spectral gain modification technique requires an accurate estimate of the current background noise power spectral density to perform the noise cancellation function.

A drawback of the Fourier Transform approach of FIG. 1 is that it is a digital signal processing method requiring considerable computational power to implement the noise suppression prefilter in the frequency domain. An alternate implementation of the noise suppression prefilter is the channel filter-bank technique illustrated in FIG. 2. In this approach, the input signal power spectral density is computed on a per-channel basis by using contiguous narrowband bandpass filters followed by full-wave rectifiers and low-pass filters. The background noise is then subtracted from the noisy speech signal by reducing the gains of the individual channel bandpass filters before recombination. This time domain implementation is preferable for use in speech recognition systems and noise suppression systems, since it is much more computationally efficient than the FFT approach.

Figure 2:
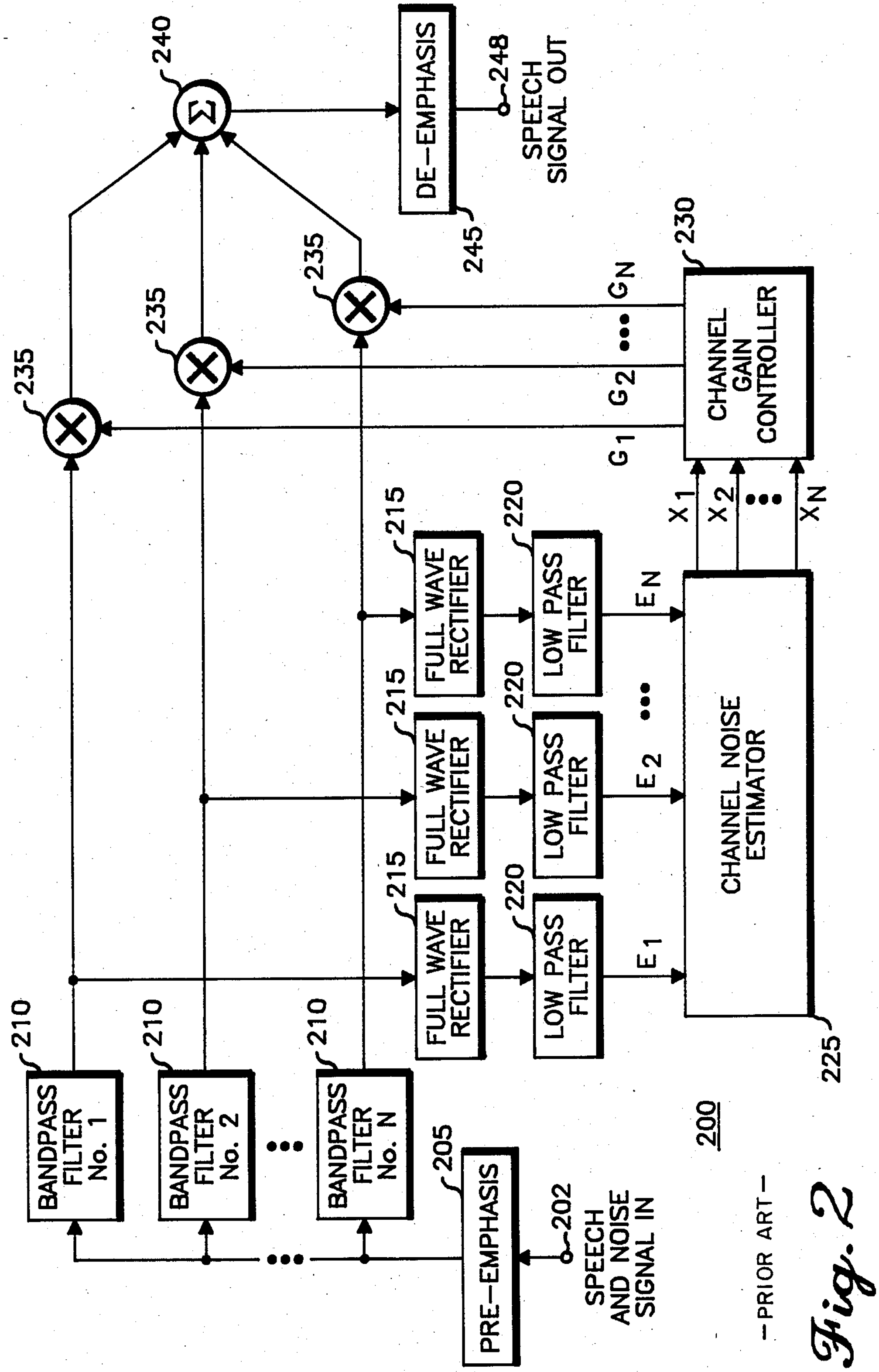
FIG. 2 is a block diagram of an alternate implementation of a prior art noise suppression system illustrating the channel filter-bank technique.

FIG. 2 illustrates channel filter-bank noise suppression prefilter 200. The speech-plus-noise signal is applied to pre-emphasis network 205 via input 202. The input signal is pre-emphasized to increase the gain of the high frequency noise and unvoiced components (at +6 dB per octave), since these components are normally lower in energy as compared to low frequency voiced components. The pre-emphasized signal is then fed to filter-bank 210, which consists of a number N of contiguous bandpass filters. The filters overlap at the 3 dB points such that the reconstructed output signal exhibits less than 1 dB of ripple in the entire voice frequency range. In the present embodiment, 14 Butterworth bandpass filters are used to span the voice frequency band of 250–3400 Hz. The 14 channel filter outputs are then rectified by full-wave rectifiers 215, and smoothed by low-pass filters 220 to obtain an energy envelope value $E_I$-$E_N$ for each channel. These channel energy estimates are applied to channel noise estimator 225 which provides an SNR estimate $X_I$-$X_N$ for each channel. These SNR estimates are then fed to channel gain controller 230 which produces individual channel gains $G_I$-$G_N$.

The value of the channel gains is dependent upon the SNR of the detected signal. When voice is present in an individual channel, the channel signal-to-noise ratio estimate will be high. Thus, channel gain controller 230 will increase the gain for that particular channel. The amount of the gain rise is dependent on the detected SNR—the greater the SNR, the more the individual channel gain will be raised from the base gain (all noise). If only noise is present in the individual channel, the SNR estimate will be low, and the gain for that channel will be reduced to the base gain. Since voice energy does not appear in all of the channels at the same time, the channels containing a low voice energy level (mostly background noise) will be suppressed (subtracted) from the voice energy spectrum.

The amplitudes of the individual channel signals output from bandpass filters 210 are multiplied by the corresponding channel gains $G_I$-$G_N$ at channel multipliers 235. The channels are then recombined at summation circuit 240, and de-emphasized (at −6 dB per octave) by de-emphasis network 245 to provide clean speech at output 248. Hence, the channel filter-bank technique simply suppresses the background noise in the individual channels which have a low signal-to-noise ratio.

Channel noise estimator 225 typically generates SNR estimates $X_I$-$X_N$ by comparing the total amount of signal-plus-noise energy in a particular bandpass filter to some type of estimate of the background noise. This background noise estimate may be generated by performing a channel energy measurement during the pauses in human speech. Thus, the problem then becomes one of accurately locating the pauses in speech such that the background noise energy can be measured during that precise time interval. The present invention is specifically addressed to the solution of this problem.

As previously mentioned, numerous techniques for distinguishing between speech and noise are known in the art. For example, the energy histogram technique monitors the energy on a frame-by-frame basis to maintain an energy histogram which reflects the bimodal distribution of the energy. An energy threshold mark is generated to provide the probable boundary line between noise and speech-plus-noise. This threshold may be updated with a current threshold candidate when the background noise energy changes. A more detailed description of the energy histogram technique can be found in R. J. McAulay and M. L. Malpass, "Speech Enhancement Using a Soft-Decision Noise Suppression Filter," *IEEE Trans. Acoust., Speech, Signal Processing,* vol. ASSP-28, no. 2, (April 1980), pp. 137–145.

Another approach for detecting pauses in human speech is the valley detector technique. A valley detector follows the minima of the envelope-detected speech signal energy by falling rapidly as the signal level decreases (speech not present), but rising slowly when the signal level increases (speech present). Thus, the valley detector maintains a history (previous valley level) essentially corresponding to the steady state background noise present at the input. When an instantaneous value of the envelope-detected speech signal energy is compared against this previous valley level, the comparator is able to distinguish between speech signals and background noise.

Both methods for making the speech/noise decision, the energy histogram technique and the valley detector technique, have heretofore been implemented by utilizing pre-processed speech—the speech-plus-noise energy available at the input of the noise suppression system. This practice of using pre-processed speech places inherent limitations upon the effectiveness of either technique to make an accurate speech/noise classification. As previously noted, this limitation is due to that fact that the energy characteristics of unvoiced speech sounds are very similar to the energy characteristics of background noise. Thus, the accuracy of the speech/noise decision is directly related to the SNR characteristics of the input signal energy. One of the most significant aspects of the present invention involves this recognition that the inaccuracy of the speech/noise decisions represents a substantial impediment to advancements in background noise elimination.

If, however, the speech/noise decision where based upon post-processed speech—the speech energy available at the output of the noise suppression system—then the accuracy of the speech/noise decision process would be greatly enhanced by the noise suppression system itself. In other words, by utilizing the post-processed speech signal, the background noise estimator operates on a much cleaner speech signal such that a more accurate speech/noise classification can be performed. The present invention teaches this unique concept of implementing post-processed speech signal to base these speech/noise decisions upon. Accordingly, more accurate determinations of the pauses in speech are made, and better performance of the noise suppressor is achieved.

Figure 3:
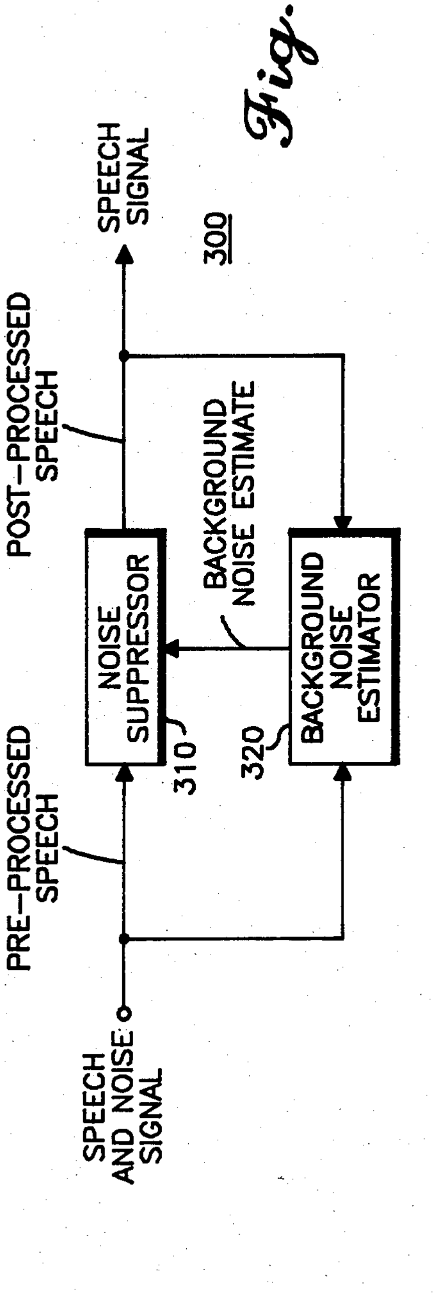
FIG. 3 is a simplified block diagram of an improved acoustic noise suppression system employing the automatic background noise estimator of the present invention.

This novel technique of the present invention is illustrated in FIG. 3, which shows a simplified block diagram of improved acoustic noise suppression system 300. Noise suppressor 310 performs speech quality enhancement upon the pre-processed speech-plus-noise signal available at the input, and generates clean post-processed speech at the output. Noise suppressor 310 utilizes the background noise estimate generated by background noise estimator 320 to perform the spectral subtraction process. Background noise estimator 320 uses post-processed speech in performing the speech/noise classification to determine when the input signal contains only background noise. It is during this time that the background noise estimator measures the energy of the pre-processed speech signal to generate the actual background noise estimate. As a result, the background noise estimate supplied to the noise suppressor is a more accurate measurement of the background noise energy, since it is performed during a more accurate determination of the occurrences of the pauses in speech.

Figure 4:
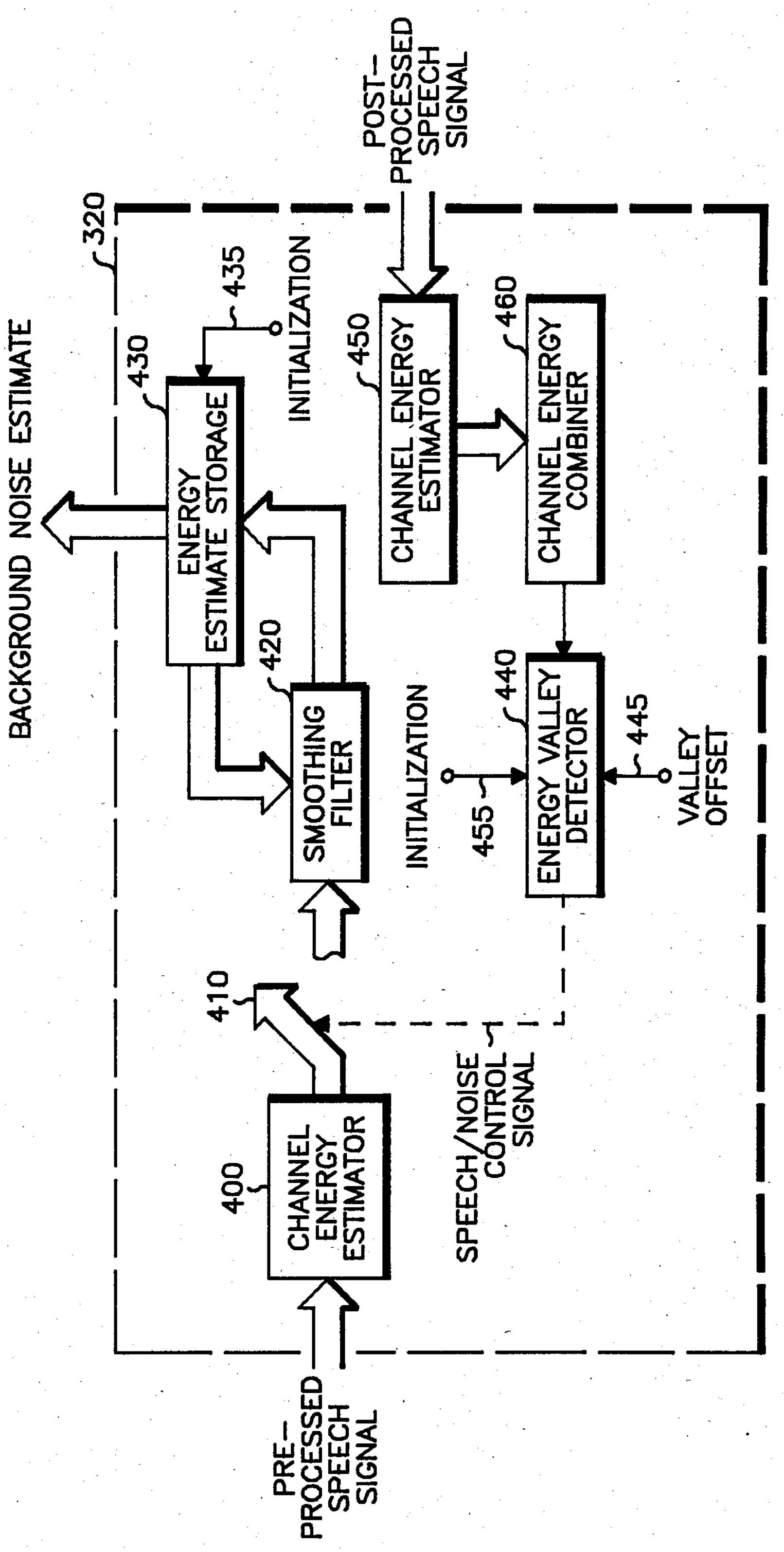
FIG. 4 is a detailed block diagram of the automatic background noise estimator of FIG. 3.

FIG. 4 shows a more detailed block diagram of background noise estimator 320 of FIG. 3. In generating the background noise estimate to the noise suppressor, two basic functions must be performed. First, a determination must be made as to when the incoming speech-plus-noise signal contains only background noise—during the pauses in human speech. Secondly, this determination is utilized to control the time at which the background noise measurement is taken, thereby providing a mechanism to update the old background noise estimate.

The first function, that of performing the speech/noise classification in a varying background noise environment, is accomplished by using the valley detector technique on speech signal obtained from the output of the noise suppression system. This post-processed speech signal is input to channel energy estimator 450 which forms individual per-channel energy estimates. Channel energy estimator 450 is comprised of an N-band contiguous-frequency filter-bank, and a set of N energy detectors at the output of each bandpass filter. Each energy detector may consist of a full-wave rectifier, followed by a second-order Butterworth low-pass filter, possibly followed by another full-wave rectifier. In the preferred embodiment, the entire background noise estimator 320 is digitally implemented, and this implementation will subsequently be described in FIGS. 5 and 6. Furthermore, channel energy estimator 450 may be one of several distinct filter/energy detector networks (or equivalent software code blocks) as illustrated in FIG. 4, or may alternately be combined with similar estimators elsewhere in the noise suppression system (or performed as a software subroutine).

In either case, these individual channel energy estimates are fed to channel energy combiner 460 which provides a single overall energy estimate for energy valley detector 440. Channel energy combiner 460 may be omitted if multiple valley detectors are utilized on a per-channel basis and the valley detector output signals are combined.

Energy valley detector 440 utilizes the overall energy estimate from combiner 460 to detect the pauses in speech. This is accomplished in three steps. First, an initial valley level is established. If the background noise estimator has not previously been initialized, then an initial valley level is created by loading initialization value 455. Otherwise, the previous valley level is maintained as its post-processed background noise energy history.

Next, the previous (or initialized) valley level is updated to reflect current background noise conditions. This is accomplished by comparing the previous valley level to the value of the single overall energy estimate from combiner 460. A current valley level is created by this updating process, which will be described in detail in FIG. *6b*.

The third step performed by energy valley detector 440 is that of making the actual speech/noise decision. A preselected valley level offset, represented in FIG. 4 by valley offset 445, is added to the updated current valley level to produce a noise threshold level. Then the value of the single overall (post-processed) energy estimate is again compared, only this time to the noise threshold level. When this energy estimate is less than the noise threshold level, energy valley detector 440 generates a speech/noise control signal (valley detect signal) indicating that no voice is present.

The second basic function of the background noise estimator is accomplished by applying this valley detect signal to channel switch 410 to cause the old noise spectral estimate to be updated. The pre-processed speech signal is applied to channel energy estimator 400 which forms per-channel energy estimates. Operation and construction of channel energy estimator 400 is identical to channel energy estimator 450, with the exception that pre-processed, rather than post-processed speech is applied to its input.

During pauses in the speech signal, as determined by energy valley detector 440, channel switch 410 is closed to allow the pre-processed speech energy estimates to be applied to smoothing filter 420. The smoothed energy estimates for each channel, obtained from the output of smoothing filter 420, are stored in energy estimate storage register 430. Elements 420 and 430, connected as shown in FIG. 4, form a recursive filter which provides a time-averaged value of each individual channel background noise energy estimate. This smoothing ensures that the current noise estimates reflect the average background noise estimates stored in storage register 430, as opposed to the instantaneous noise energy estimates available at the output of switch 410. It is this method of accurately controlling the time at which the background noise measurement is performed by smoothing filter 420 and energy estimate storage register 430 that provides an update to the old background noise estimate.

When the system is first powered-up, no old background noise estimate exists in energy estimate storage register 430, and no noise energy history exists in energy valley detector 440. Consequently, storage register 430 is preset with initialization value 435, which represents a background noise estimate value corresponding to a clean speech signal at the input. Similarly, as noted earlier, energy valley detector 440 is preset with initialization value 455, which represents a valley level corresponding to a noisy speech signal at the input. Initially, no noise suppression is being performed. As a result, energy valley detector 440 is performing speech/noise decisions on speech energy which has not yet been processed.

Eventually, valley detector 440 provides rough speech/noise decisions to channel switch 410, which causes the initialized background noise estimate to be updated. As the background noise estimate is updated, the noise suppressor begins to process the input speech energy by suppressing the background noise. Consequently, the post-processed speech energy exhibits a greater signal-to-noise ratio for the valley detector to utilize in making more accurate speech/noise classifications. After the system has been in operation for a short period of time (e.g., 100–500 milliseconds), the valley detector is essentially operating on clean speech. Thus, reliable speech/noise decisions control switch 410, which, in turn, permit energy estimate storage register 430 to very accurately reflect the background noise power spectrum. It is this "bootstrapping technique'-'—updating the initialization value with more accurate background estimates—that allows the present invention to generate very accurate background noise estimates for an acoustic noise suppression system.

Figure 5:
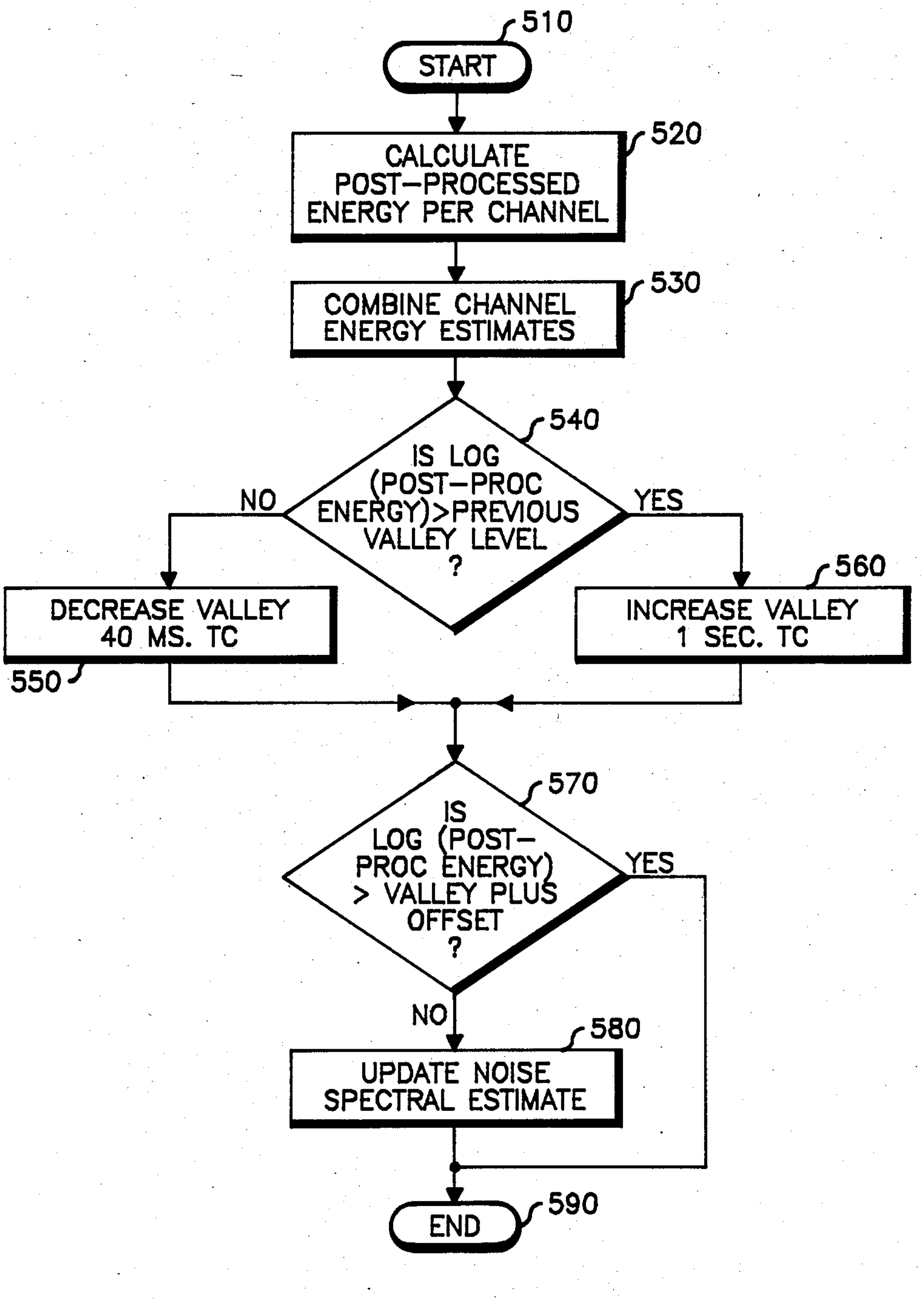
FIG. 5 is a flowchart illustrating the general sequence of operations performed in accordance with the practice of the present invention.
Figure 6A:
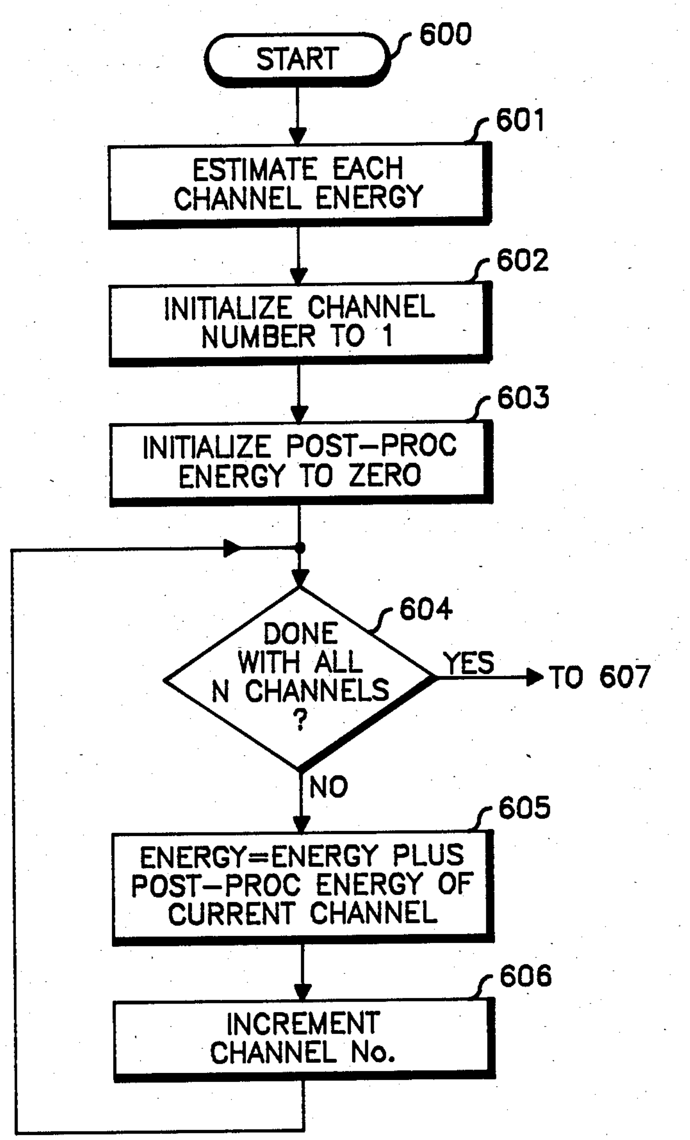
FIG. 6 is a detailed flowchart illustrating the specific sequence of operations shown in FIG. 5.
Figure 6B:
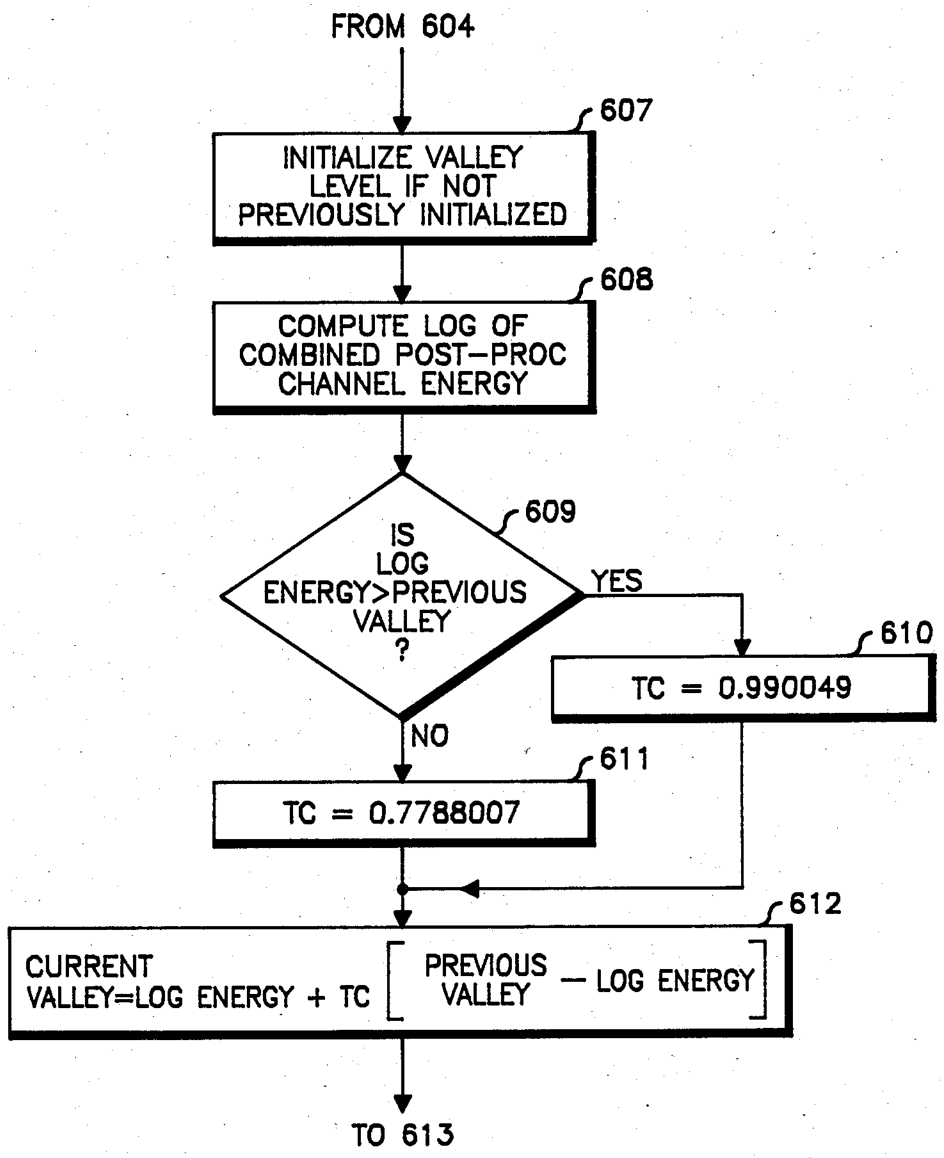
Figure 6C:
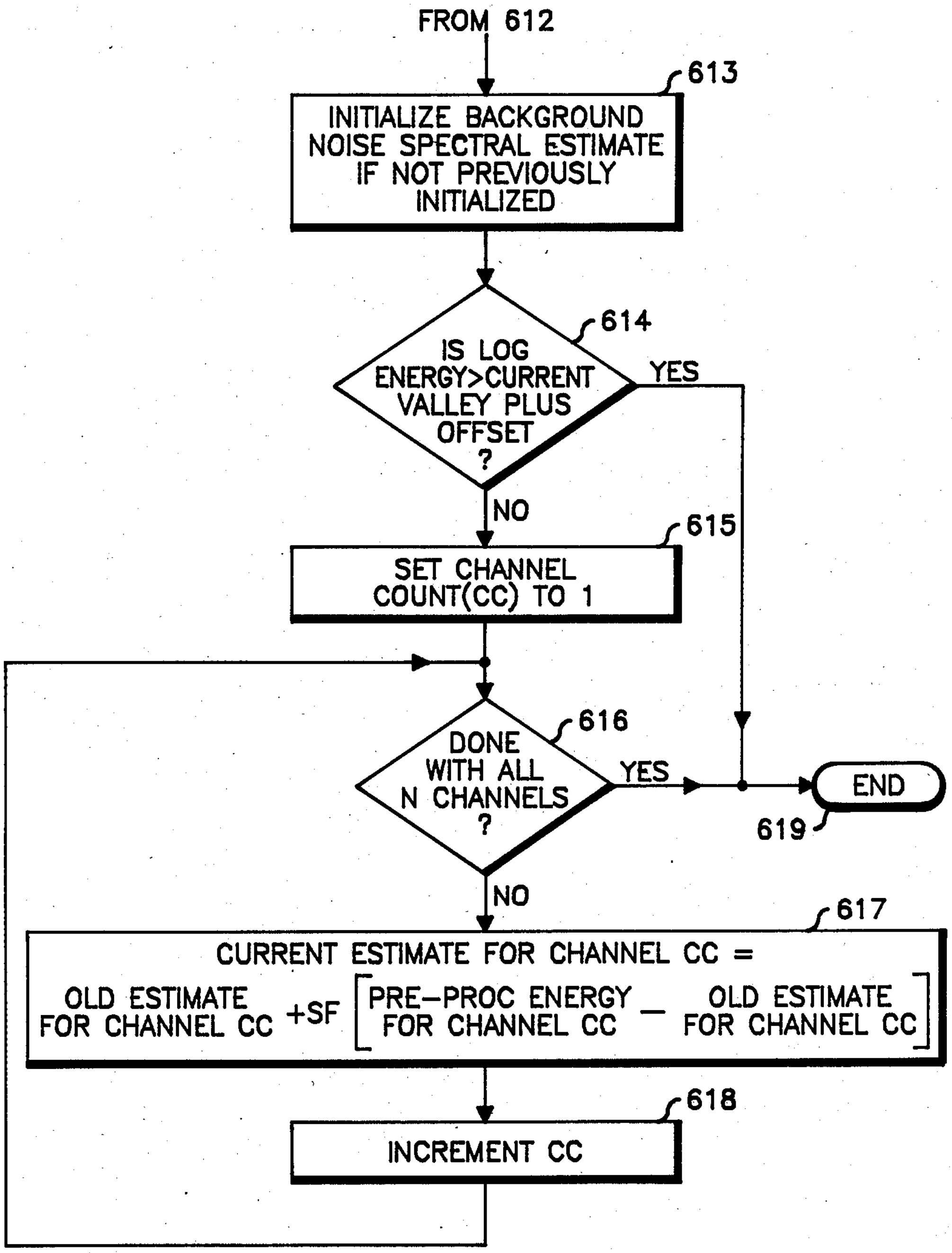

FIG. 5 is a flowchart illustrating the overall operation of the present invention. The flowchart of FIG. 5 corresponds to the operation of background noise estimator 320 of FIG. 3 and FIG. 4. The operation beginning at start 510, and continuing through end 590, is followed during each frame period. The frame period is defined as being a 10 millisecond duration time interval to which the input signal is quantized. At the end of each frame period, the post-processed speech energy at the output of noise suppressor 310 is calculated for each channel during block 520. This corresponds to the operation of channel energy estimator 450. The operation of channel energy combiner 460 is illustrated in block 530, wherein the individual channel energy estimates are combined in an additive manner so as to form a single overall channel energy estimate.

The operation of energy valley detector 440 is illustrated in blocks 540 through 570. Following the logarithmic conversion of the combined channel energy estimate from block 530, decision block 540 compares the logarithmic value of the post-processed speech energy to the previous valley level. The log representation of the post-processed energy is used in the present embodiment to facilitate the particular software implementation. Other representations of the signal energy may also be utilized.

If the log value exceeds the previous valley level, the previous valley level is updated in block 560 with the current log [post-processed energy] value by increasing the level with a slow time constant of approximately one second to form a current valley level. If the output of decision block 540 is negative (i.e., log [post-processed energy] less than previous valley level), the previous valley level is updated in block 550 with the current log [post-processed energy] value by decreasing the level with a fast time constant of approximately 40 milliseconds to form a current valley level.

Thus, blocks 540 through 560 illustrate the mechanism for updating the background noise energy history maintained by the valley detector. The previous valley level is increased at a very slow rate (on the order of a one second time constant) when the instantaneous energy estimate value is greater than the previous valley level of the background noise estimate. This occurs when voice is present. Conversely, the previous valley level is rapidly decreased (on the order of a 40 millisecond time constant) when the instantaneous energy estimate is less than the previous valley level—when minimal background noise is present. Accordingly, the background noise history is continuously updated by slowly increasing or rapidly decreasing the previous valley level, depending upon the amount of background noise in the current post-processed speech energy estimate.

Subsequent to the updating of the previous valley level (block 550 or block 560), decision block 570 tests if the current log [post-processed energy] value exceeds the current valley level plus the predetermined offset (corresponding to valley offset 445). The addition of the current valley level plus valley offset produces a noise threshold level. The current log value is then compared to this noise threshold. If the result of this comparison is negative, a decision that only noise is present at the input is made, and the background noise spectral estimate is updated in block 580. This corresponds to the closing of channel switch 410, which allows new noise energy estimates to be stored in energy estimate storage register 430. If the result of the test is affirmative, indicating that speech is present, the background noise estimate is not updated. In either case, the operation of the background noise estimator ends at block 590 for the particular frame being processed.

The flowchart of FIGS. *6a*, *6b*, and *6c*, illustrate the specific details of the sequence of operation of the present invention. More particularly, these Figures divide the general operation flowchart of FIG. 5 into three functional parts: signal processing of the post-processed speech signal (FIG. *6a*); updating the previous valley level (FIG. *6b*); and updating the background noise spectral estimate according to the valley detector's speech/noise decision (FIG. *6c*).

FIG. *6a* more rigorously describes the signal processing steps of blocks 510 through 530 of FIG. 5. For each 10 milliseconds frame period, the post-processed speech signal processing operation begins at start 600. The first step, block 601, is to calculate the amount of post-processed energy in each channel. This corresponds to the function of channel energy estimator 450. As previously described in FIG. 2, the signal power spectrum is calculated by utilizing contiguous narrowband bandpass filters followed by full-wave rectifiers and low-pass filters. Hence, an energy envelope value $E_I$-$E_N$ is computed for each channel. The preferred embodiment of the invention utilizes digital signal processing (DSP) techniques to digitally implement in software the hardware functions described in FIG. 2, although numerous other approaches may be used. An appropriate DSP algorithm is described in Chapter 11 of L. R. Rabiner and B. Gold, *Theory and Application of Digital Signal Processing*, (Prentice Hall, Englewood Cliffs, N.J., 1975).

Following calculation of the post-processed energy per channel, blocks 602 through 606 function to combine the individual channel energy estimates to form the single overall energy estimate according to the equation:

$$\sum_{i=1}^{N} \text{CHANNEL}(i)\ \text{POST-PROCESSED ENERGY}$$

where N is the number of filters in the filter-bank. Block 602 initializes the channel number to 1, and block 603 initializes the overall post-processed energy value to 0. After initialization, decision block 604 tests whether or not all channel energies have been combined. Block 605 adds the post-processed energy value for the current channel to the overall post-processed energy value. The current channel number is then incremented in block 606, and the channel number is again tested at block 604. When all N channels have been combined to form the overall post-processed energy estimate, operation proceeds to block 607.

Referring now to FIG. *6b*, blocks 607 through 612 illustrate how the post-processed signal energy is used to generate and update the previous valley level, corresponding to blocks 540 through 560 of FIG. 5. After all the post-processed energies per channel have been combined (FIG. *6a*), block 607 initializes the valley level to form a previous valley level, unless it has been initialized during a prior frame. In the present embodiment, a large energy estimate value is used to initialize the valley detector, which would correspond to a high background noise environment. This value must be selected in a manner consistent with the particular arithmetical scheme utilized in the specific implementation (e.g., logarithmic).

In block 608, the logarithm of the combined post-processed channel energy is then computed. The log representation of the post-processed speech energy is used in the present embodiment to facilitate implementation of an extremely large dynamic range (>90 dB) signal in an 8-bit microprocessor system.

Decision block 609 then tests to see if this log energy value exceeds the previous valley level. If this test result is affirmative, block 610 sets the valley smoothing time constant (TC) to the numerical representation of 0.990049, which corresponds to a 1 second rise time in a system employing 10 millisecond duration frames. If the decision reached in block 609 is negative, block 611 sets the time constant to the numerical representation of 0.7788007, which corresponds to a 40 millisecond fall time for a 10 millisecond frame duration.

The TC value determined in block 609 through 611 is then utilized in block 612 to update the previous valley level according to the equation:

$$\text{CURRENT VALLEY} = \text{LOG ENERGY} + \text{TC}\,[\text{PREVIOUS VALLEY} - \text{LOG ENERGY}]$$

where log energy is the logarithmic value of the combined post-processed noise estimate obtained from block 608. The result of this equation is to update the background noise energy history maintained in the valley detector by slowly increasing or rapidly decreasing the previous valley level.

FIG. *6c* illustrates how the speech/noise decision is performed, and how the background noise estimate is updated with the instantaneous pre-processed speech energy. FIG. *6c* corresponds to blocks 570 through 590 of FIG. 5. After the valley level has been updated (FIG. *6b*), the background noise spectral estimate is initialized in block 613, unless a previous initialization has taken place in an earlier frame. This initialization is functionally equivalent to initialization 435 of FIG. 4.

Decision block 614 tests whether the log of the post-processed energy, generated in block 608, exceeds the current valley level (provided by block 612) plus the offset. This offset corresponds to valley offset 445 of FIG. 4, and in the present embodiment, provides approximately a 6 dB increase to the current valley level.

The valley level plus offset provides the noise threshold level to which the log value of the combined post-processed channel energy is compared. If the log energy exceeds this threshold, which would correspond to a frame of speech instead of background noise, the current background noise estimate is not updated and the process terminates at block 619.

If, however, the log energy does not exceed the noise threshold level, which would correspond to a detected minima in the post-processed signal, the valley detector would generate a positive valley detect signal and the current background noise estimate would be updated. Blocks 615 through 618 perform this updating, which can be visualized as the closing of channel switch 410 of FIG. 4.

Blocks 615 through 618 serve to update the current background noise estimate estimate in each of the N channels via the equation:

$$E(i,k)=E(i,k-1)+SF[(PE(i)-E(i,k-1)],$$

$$i=1,2,\ldots,N$$

where E(i,k) is the current energy noise estimate for channel (i) at time (k), E(i,k−1) is the old energy noise estimate for channel (i) at time (k−1), PE(i) is the current pre-processed energy estimate for channel (i), and SF is the smoothing factor time constant used in smoothing the background noise estimates. Thus, E(i,k−1) is stored in energy estimate storage register 430, PE(i) is obtained from channel energy estimator 400, and the SF term performs the function of smoothing filter 420. In the present embodiment, SF is selected to be 0.1 for a 10 millisecond frame duration.

Block 615 initializes the channel count (cc) to 1. Block 616 tests to see if all N channels have been processed. If true, the background noise estimate update is completed, and operation is terminated at block 619. If not true, block 617 updates the old noise estimate for the current channel using the above equation. The channel count is then incremented by 1 in block 618, and the sequence of operations of block 616 through 618 repeats until all per-channel noise estimates have been updated. As a result, the background noise estimator of the present invention continuously provides an accurate estimate of the background noise power spectral density to the noise suppression system.

While specific embodiments of the present invention have been shown and described herein, further modifications and improvements may be made by those skilled in the art. All such modifications which retain the basic underlying principles disclosed and claimed herein are within the scope of this invention.

What is claimed is:

1. An improved background noise estimator adapted for use with a noise suppression system wherein the background noise from a noisy pre-processed input signal is attenuated by spectral gain modification to produce a noise-suppressed post-processed output signal, said background noise estimator comprising:

noise estimation means for generating and storing an estimate of the background noise power spectral density of the pre-processed signal; and noise detection means for periodically detecting the minima of the post-processed signal energy, and for controlling said noise estimation means in response thereto such that said background noise estimate is updated only during said minima.

2. The background noise estimator according to claim 1, wherein said noise estimation means includes:

channel energy estimation means for generating an estimate of the pre-processed signal energy in each of a plurality of selected frequency bands; and storage means for storing each of said energy estimates as a per-channel noise estimate, and for continuously providing an estimate of the background noise power spectral density of the pre-processed signal to said noise suppression system.

3. The background noise estimator according to claim 2, wherein said channel energy estimation means includes:

means for separating said pre-processed signal into a plurality of frequency channels; and means for detecting the energy in each of said channels.

4. The background noise estimator according to claim 3, wherein said separating means includes a plurality of bandpass filters covering the voice frequency range.

5. The background noise estimator according to claim 4, wherein said plurality of bandpass filters is further comprised of a bank of approximately 14 contiguous bandpass filters covering the frequency range from approximately 250 Hz. to 3400 Hz.

6. The background noise estimator according to claim 3, wherein said detecting means includes a plurality of full-wave rectifiers coupled to low-pass filters, thereby providing an energy estimate for each channel.

7. The background noise estimator according to claim 2, wherein said storage means includes:

smoothing means for providing a time-averaged value of each of said energy estimates generated by said channel energy estimation means; and memory means for storing each of said time-averaged values from said smoothing means as per-channel noise estimates.

8. The background noise estimator according to claim 7, wherein said memory means is preset upon system initialization with initialization values which represent per-channel noise estimates approximating that of a clean input signal.

9. The background noise estimator according to claim 1, wherein said noise detection means includes:

channel energy estimation means for generating an estimate of the post-processed signal energy in each of a plurality of selected frequency bands;

channel combination means for combining the plurality of said energy estimates into a single overall energy estimate;

valley detection means for periodically detecting the minima of said overall energy estimate, thereby generating a valley detect signal; and signal controlling means coupled to said noise estimation means and controlled by said valley detect signal for providing new background noise estimates to said noise estimation means only during said minima.

10. The background noise estimator according to claim 9, wherein said channel energy estimation means includes:

means for separating said post-processed signal into a plurality of frequency channels; and means for detecting the energy in each of said channels.

11. The background noise estimator according to claim 10, wherein said separating means includes a plurality of bandpass filters covering the voice frequency range.

12. The background noise estimator according to claim 11, wherein said plurality of bandpass filters is further comprised of a bank of approximately 14 contiguous bandpass filters covering the frequency range from approximately 250 Hz. to 3400 Hz.

13. The background noise estimator according to claim 10, wherein said detecting means includes a plurality of full-wave rectifiers coupled to low-pass filters, thereby providing an energy estimate for each channel.

14. The background noise estimator according to claim 9, wherein said channel combination means includes means for summing the plurality of detected energy estimates to provide a single overall energy estimate.

15. The background noise estimator according to claim 9, wherein said valley detection means includes:
- means for storing the numerical value of the previous detected minima as a previous valley level;
- means for comparing the present numerical value of the overall energy estimate to said previous valley level;
- means for increasing said previous valley level at a slow rate when said present numerical value is greater than said previous valley level; and
- means for decreasing said previous valley level at a rapid rate when said present numerical value is less than said previous valley level, thereby updating said previous valley level to provide a current valley level.

16. The background noise estimator according to claim 15, wherein said rapid rate for updating said previous valley level exhibits a time constant of approximately 40 milliseconds.

17. The background noise estimator according to claim 15, wherein said slow rate for updating said previous valley level exhibits a time constant of approximately 1000 milliseconds.

18. The background noise estimator according to claim 15, wherein said valley detection means further includes:
- means for adding a selected valley offset to said current valley level, thereby providing a noise threshold level; and
- means for comparing said present numerical value to said noise threshold level, thereby generating a positive valley detect signal only when said present numerical value is less than said noise threshold level.

19. The background noise estimator according to claim 18, wherein said selected valley offset is approximately 6 dB relative to said current valley level.

20. The background noise estimator according to claim 18, wherein said present numerical value and said previous valley level are expressed in logarithmic terms.

21. The background noise estimator according to claim 9, wherein said signal controlling means includes:
- channel switch means coupled to said noise estimation means and controlled by said valley detect signal for providing new background noise estimates to said noise estimation means only when said valley detect signal is positive.

22. An improved background noise estimator adapted for use with a noise suppression system wherein the background noise from a noisy pre-processed input signal is attenuated by spectral gain modification to produce a noise-suppressed post-processed output signal, said background noise estimator comprising:
- storage means for storing an estimate of the background noise energy of the pre-processed signal in each of a plurality of selected frequency bands as per-channel noise estimates, and for continuously providing an estimate of the background noise power spectral density of the pre-processed signal to said noise suppression system;
- valley detection means for periodically detecting the minima of an overall estimate of the energy of said post-processed signal in each of a plurality of selected frequency bands, thereby generating a valley detect signal; and
- signal controlling means coupled to said storage means and controlled by said valley detect signal for providing new background noise estimates to said storage means only during said minima.

23. The background noise estimator according to claim 22, wherein said storage means includes:
- smoothing means for providing a time-averaged value of each of said background noise energy estimates of the pre-processed signal in a particular frequency band; and
- memory means for storing each of said time-averaged values from said smoothing means as per-channel noise estimates.

24. The background noise estimator according to claim 23, wherein said memory means is preset upon system initialization with initialization values which represent per-channel noise estimates approximating that of a clean input signal.

25. The background noise estimator according to claim 22, wherein said valley detection means includes:
- means for storing the numerical value of the previous detected minima as a previous valley level;
- means for comparing the present numerical value of the overall energy estimate to said previous valley level;
- means for increasing said previous valley level at a slow rate when said present numerical value is greater than said previous valley level; and
- means for decreasing said previous valley level at a rapid rate when said present numerical value is less than said previous valley level, thereby updating said previous valley level to provide a current valley level.

26. The background noise estimator according to claim 25, wherein said rapid rate for updating said previous valley level exhibits a time constant of approximately 40 milliseconds.

27. The background noise estimator according to claim 25, wherein said slow rate for updating said previous valley level exhibits a time constant of approximately 1000 milliseconds.

28. The background noise estimator according to claim 25, wherein said valley detection means further includes:
- means for adding a selected valley offset to said current valley level, thereby providing a noise threshold level; and
- means for comparing said present numerical value to said noise threshold level, thereby generating a positive valley detect signal only when said present numerical value is less than said noise threshold level.

29. The background noise estimator according to claim 28, wherein said selected valley offset is approximately 6 dB relative to said current valley level.

30. The background noise estimator according to claim 22, wherein said signal controlling means includes:

channel switch means coupled to said storage means and controlled by said valley detect signal for providing new background noise estimates to said storage means only when said valley detect signal is positive.

31. The background noise estimator according to claim 28, wherein said present numerical value and said previous valley level are expressed in logarithmic terms.

32. The method of estimating background noise in a noise suppression system, wherein the background noise from a noisy pre-processed input signal is attenuated by spectral gain modification to produce a noise-suppressed post-processed output signal, comprising the steps of:

periodically detecting the minima of the post-processed signal energy;

providing a noise detection signal only when said minima is detected; and generating and storing an estimate of the background noise power spectral density of the pre-processed signal only during the presence of said noise detection signal.

33. The method of estimating background noise in a noise suppression system, wherein the background noise from a noisy pre-processed input signal is attenuated by spectral gain modification to produce a noise-suppressed post-processed output signal, comprising the steps of:

periodically detecting the minima of an overall estimate of the energy of the post-processed signal in each of a plurality of selected frequency bands;

providing a positive valley detect signal only when said minima is detected; and storing an estimate of the energy of the pre-processed signal in each of a plurality of selected frequency bands only during the presence of said positive valley detect signal.

* * * * *